(12) United States Patent
Saeki

(10) Patent No.: US 6,519,867 B1
(45) Date of Patent: Feb. 18, 2003

(54) MEASURING DEVICE

(75) Inventor: Akitomo Saeki, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/613,142

(22) Filed: Jul. 10, 2000

(30) Foreign Application Priority Data

Jul. 13, 1999 (JP) ............................................ 11-198860

(51) Int. Cl.⁷ ................................................. G01B 3/18
(52) U.S. Cl. ............................. 33/813; 33/830; 33/831; 33/679.1
(58) Field of Search ....................... 33/813, 818, 830, 33/679.1, 494, 831, 483, 484, 486, 488

(56) References Cited

U.S. PATENT DOCUMENTS

| | | | | |
|---|---|---|---|---|
| 946,268 A | * | 1/1910 | Peters | ........................... 33/818 |
| 2,349,604 A | | 5/1944 | Barrows | |
| 2,609,607 A | * | 9/1952 | Rinker et al. | ................... 33/818 |
| 2,707,834 A | | 5/1955 | Zuckerman | |
| 2,717,451 A | | 9/1955 | Gondek | |
| 2,788,582 A | * | 4/1957 | Middeler | ....................... 33/542 |
| 2,865,108 A | | 12/1958 | Lengyel | |
| 3,092,913 A | * | 6/1963 | Bugge | .......................... 33/818 |
| 3,787,982 A | * | 1/1974 | Anderson | ..................... 33/494 |
| 5,884,408 A | * | 3/1999 | Simmons | ...................... 33/494 |

FOREIGN PATENT DOCUMENTS

| | | | | |
|---|---|---|---|---|
| CA | 0590823 | * | 1/1960 | ................... 33/813 |
| CH | 72395 | * | 5/1916 | ................... 33/494 |
| DE | 0584731 | * | 9/1933 | ................... 33/813 |
| DE | 0901845 | * | 1/1954 | ................... 33/830 |
| DE | 0041673 | * | 10/1965 | ................... 33/818 |
| GB | 0408512 | * | 4/1934 | ................... 33/813 |
| GB | 0552779 | * | 4/1943 | ................... 33/831 |
| GB | 0710407 | * | 6/1954 | ................... 33/813 |
| IT | 0657046 | * | 10/1963 | ................... 33/818 |
| JP | 06058791 A | * | 3/1994 | ........... G01F/19/00 |
| SU | 0879256 | * | 11/1981 | ................... 33/813 |

\* cited by examiner

Primary Examiner—Diego Gutierrez
Assistant Examiner—Lydia M. De Jesús
(74) Attorney, Agent, or Firm—Oliff & Berridge, PLC

(57) ABSTRACT

A micrometer comprising a thimble made, at least in part, of a translucent material, a vernier scale on an inner circumference of the thimble along the circumferential direction and a vernier numeral on an outer circumference of the thimble along the circumferential direction, whereby reading error during measurement can be reduced.

6 Claims, 5 Drawing Sheets

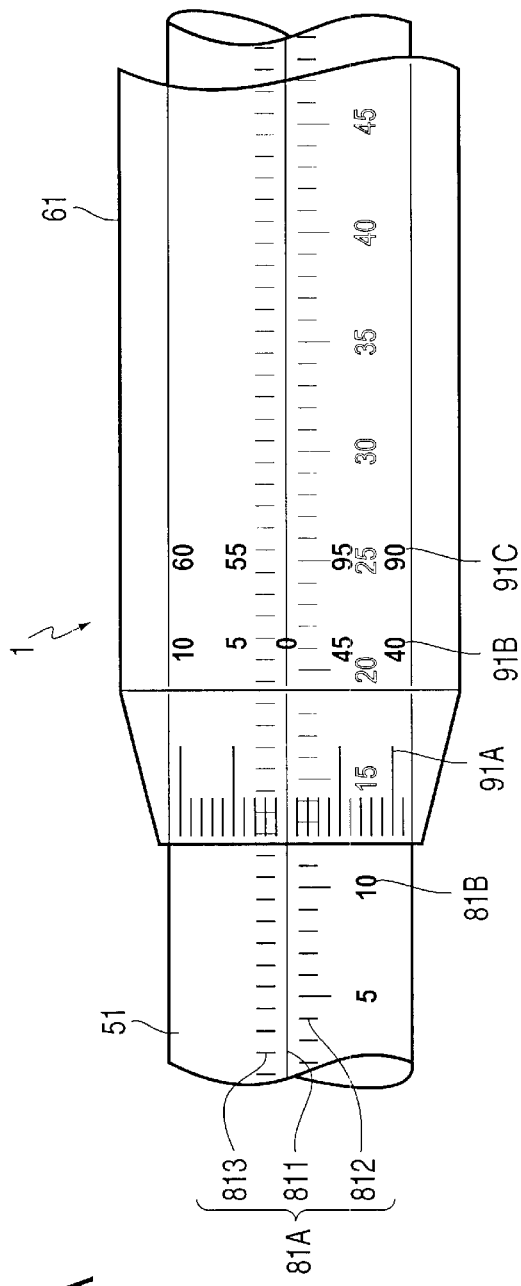
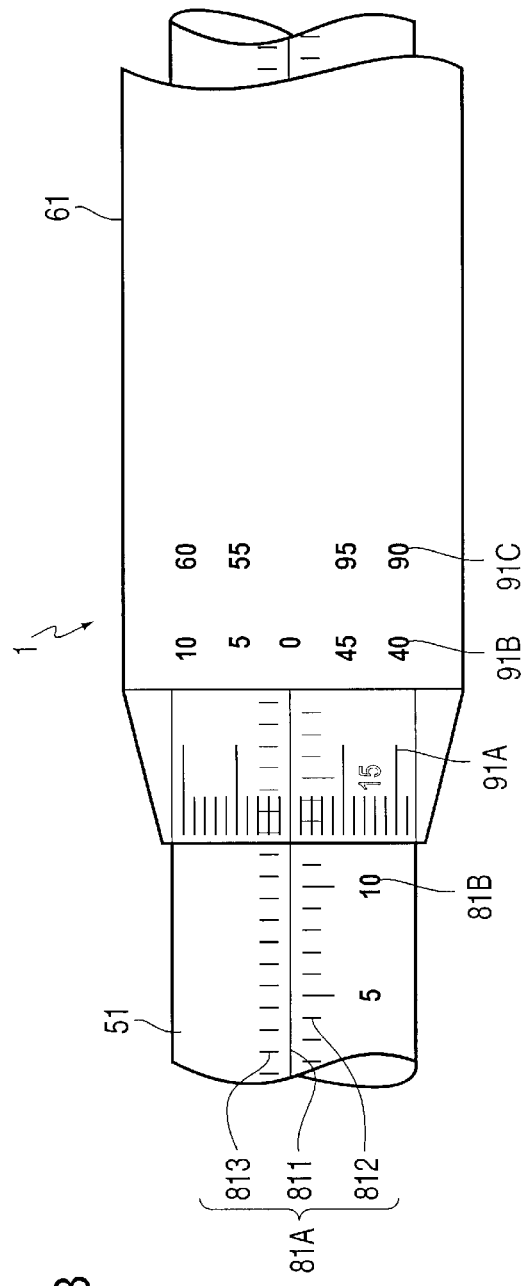
FIG. 2A
FIG. 2B

MEASURING DEVICE

BACKGROUND OF THE INVENTION

1. Field of the Invention

The present invention relates to a measuring device such as a micrometer for measuring length and thickness of a workpiece.

2. Description of Related Art

Conventionally, as shown in FIG. 4, a micrometer 100 has an approximately U-shaped frame 101, an anvil 102 secured to one end of the frame 101 and a sleeve 110 held at the other end thereof. The sleeve 110 is composed of an inner sleeve 103 with a base end thereof being fixed to the frame 101 and an outer sleeve 105 fixed to an outer circumference of the inner sleeve 103 protruding from frame 101. A part of an inner circumference of a tip end of the inner sleeve 103 has a plurality of slotted grooves and a female screw, and a male screw portion 104A of a spindle 104 is screwed to the female screw. A tip end of the spindle 104 without the male screw portion 104A is slidably fitted to a portion of the frame 101 for the inner sleeve 103 to be fixed, and the spindle 104 is held advanceable and retractable relative to the anvil 102. One end of a thimble 106 is rotatably free-fitted to an outside of the outer sleeve 105 fitted to an outer circumference of the inner sleeve 103, and the other end of the thimble 106 is integrally connected to the spindle 104. A ratchet mechanism 107 freerunning when more than a predetermined load is applied to the spindle 104 is provided to a rear end of the spindle 104.

A main scale 108A and main scale numeral 108B are formed on an outer circumference of the outer sleeve 105 at an even pitch along axial direction. A vernier scale 109A equally dividing the circumference at fifty pitches and a vernier numeral 109B corresponding to the number of the vernier scale 109A are formed on an outer circumference of the thimble 106 in circumferential direction at an even pitch. Incidentally, the main scale 108A is formed by engraving, printing, dichroic molding, laser marking etc. The vernier scale 109A is, as shown in FIG. 5, formed on a tapered portion 106A of the thimble 106 by engraving, printing, dichroic molding, laser marking etc.

The main scale 108A on the outer sleeve 105 is composed of a base line 111, a base scale 112 at 1 mm pitch and an intermediate scale 113 in the midst of the base scale 112, where interval between the respective scales 108A shows 0.5mm displacement. Since the thimble 106 advances and retreats for one scale distance (1 mm) of the base scale 112 of the main scale 108A by two rotations thereof, the pitch of the thimble 106 becomes 0.5 mm. The vernier scale 109A provided on the thimble 106 equally divides the circumference of the thimble 106 at fifty pitches. Accordingly, one scale of the vernier scale 109A corresponds to one hundredth of one scale of the main scale 108A. In other words, one scale of the vernier scale 109A indicates displacement of 0.01 mm.

The displacement of the spindle 104 relative to the anvil 102 can be measured by the above main scale 108A, the vernier scale 109A, the main scale numeral 108B and the vernier numeral 109B. In other words, dimension of a workpiece held between the anvil 102 and the spindle 104 can be measured by the above arrangement.

In the above-described micrometer 100, the vernier numeral 109B on the thimble 106 is from 0 mm to 45 mm (ordinarily at five scale interval) and measurement value can be read directly by the vernier numeral 109B at, for instance, from 0.0 mm to 0.5 mm section. However, when the measurement is conducted in 0.5 mm to 1.0 mm section, since the indication of the vernier numeral 109B is 0 mm to 45 mm, 0.5 mm has to be added to the current read value to convert 0.5 mm to 1.0 mm. Accordingly, read error of the measurement arithmetic calculation.

Further, the scale of the micrometer 100 is read by reading coincidence point of the base line 111 on the outer circumference of the outer sleeve 105 with the vernier scale 109A of the thimble 106. At this time, since the vernier scale 109A is formed on the tapered portion 106A of the thimble 106, parallax error can be caused in measurement. In other words, on both scale surfaces of the outer sleeve 105 provided with the main scale 108A and the thimble 106 provided with vernier scale 109A, the coincidence of the scales is read with a level difference T (according to JIS standard of not more than 0.4 mm) including end surface dimension (currently 0.25 mm) intervening therebetween, thus deviating degree of coincidence according to eye position and causing read error.

SUMMARY OF THE INVENTION

An object of the present invention is to provide a measuring device capable of reducing read error.

A measuring device according to the present invention has: a spindle advanceable and retractable relative to a workpiece; a sleeve partly screwed to the spindle and having a main scale and a main scale numeral on an outer circumference thereof along axial direction; and a thimble rotatably provided on an outside of the sleeve and integrally connected to the spindle, the thimble advancing and retracting for one scale of the main scale by two rotations thereof, the measuring device is characterized in that a vernier scale for equally dividing circumference of the thimble in a plurality of times is provided to an inner circumference of the thimble and that at least a part of a material of the thimble having the vernier scale is translucent.

According to the present invention, since the vernier scale is on the inner circumference of the thimble substantially in contact with the outer circumference of the outer sleeve, the level difference can be reduced for the dimension of the end surface of the thimble, so that the parallax error can be reduced in reading the coincidence point of the base line of the main scale and the vernier scale.

A measuring device according to another aspect of the present invention includes: a spindle advanceable and retractable relative to a workpiece; a sleeve partly screwed to the spindle and having a main scale and a main scale numeral on an outer circumference thereof along axial direction; and a thimble rotatably provided on an outside of the sleeve and integrally connected to the spindle, the thimble advancing and retracting for one scale of the main scale by two rotations thereof, the measuring device being characterized in having a vernier scale for equally dividing a circumference of the thimble in a plurality of times in circumferential direction, first vernier numeral corresponding to indication of the vernier scale, and second vernier numeral equal to addition of respective value of the first vernier numeral and the value of the vernier scale of one rotation.

According to the present invention, by providing the second vernier numeral of the thimble as, for instance, when the main scale is 1 mm pitch, 55 to 95, there is no need for adding 0.5 mm to the current read value during measurement of 0.5 mm to 1.0 mm section and the second vernier numeral can be directly read, thus reducing read error.

A measuring device according to further aspect of the present invention includes: a spindle advanceable and retractable relative to a workpiece; a sleeve partly screwed to the spindle and having a main scale and a main scale numeral on an outer circumference thereof along axial direction; and a thimble rotatably provided on an outside of the sleeve and integrally connected to the spindle, the thimble advancing and retracting for one scale of the main scale by two rotations thereof, the measuring device being characterized in that a vernier scale for equally dividing circumference of the thimble in a plurality of times is provided to an inner circumference of the thimble; that an inner circumference of the thimble has a vernier scale for equally dividing a circumference of the thimble in a plurality of times in circumferential direction, and an outer circumference of the thimble has first vernier numeral corresponding to indication of the vernier scale, and second vernier numeral equal to addition of respective values of the first vernier numeral and the value of the vernier scale of one rotation; and that at least a part of a material of the thimble having the vernier scale is translucent.

According to the present invention, by providing the second vernier numeral of the thimble as, for instance, when the main scale is 1 mm pitch, 55 to 95, there is no need for adding 0.5 mm to the current read value during measurement of 0.5 mm to 1.0 mm section and the second vernier numeral can be directly read, thus reducing read error.

Further, since the vernier scale is on the inner circumference of the thimble substantially in contact with the outer circumference of the outer sleeve, the level difference can be reduced for the dimension of the end surface of the thimble, so that the parallax error can be reduced in reading the coincidence point of the base line of the main scale and the vernier scale.

In the above, the main scale may preferably have a base scale provided at 1 mm pitch and an intermediate scale provided in the midst of the base scales, the base scale and the intermediate scale having different colors.

Further, the first vernier numeral may preferably be colored correspondingly to the base scale and the second vernier numeral may preferably be colored correspondingly to the intermediate scale.

According to the above arrangement, read error of the measurer can be further reduced. In other words, since the base scale and the intermediate scale have different colors, the measurer can be definitely aware of which one of measurement unit he is at.

Further, since the color of the first and the second vernier numeral corresponds to the base scale and the intermediate scale on the main scale, the vernier numeral corresponding to the color of the scale on the main scale most adjacent to the thimble end further distinctively comes to measurer's sense, so that the read error can be further effectively prevented by reading the corresponding vernier numeral.

BRIEF DESCRIPTION OF THE DRAWINGS

FIGS. 2(A) and 2(B) are enlarged plan views showing a thimble portion of FIG. 1;

DETAILED DESCRIPTION OF PREFERRED EMBODIMENT(S)

An embodiment of the present invention will be described below with reference to attached drawings.

Figure 1:
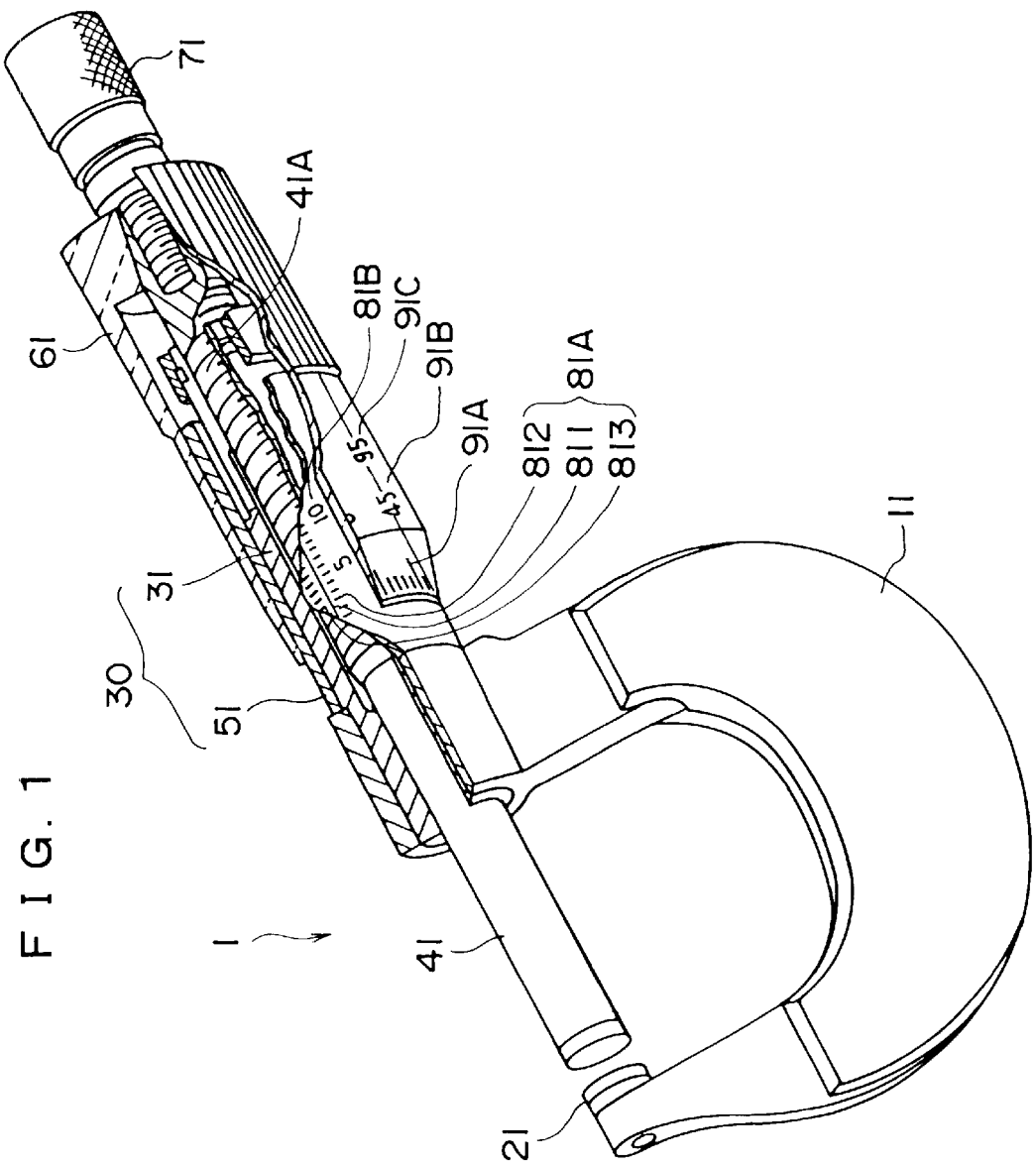
FIG. 1 is a partly fragmented perspective view showing a micrometer according to an embodiment of the present invention.

In FIG. 1, as micrometer 1 has an approximately U-shaped frame 11, and anvil 21 secured to one end of the frame 11 and a sleeve 30 held at the other end thereof. The sleeve 30 is composed of an inner sleeve 31 with a base end thereof being fixed to the frame 11 and an outer sleeve 51 fixed to an outer circumference of the inner sleeve 31 protruding from the frame 11. A part of an inner circumference of a tip end of the inner sleeve 31 has a plurality of slotted grooves and a female screw, and a male screw portion 41A of a spindle 41 is screwed to the female screw. A tip end of the spindle 41 without the male screw portion 41 A is slidably fitted to a portion of the frame 11 for the inner sleeve 31 to be fixed, and the spindle 41 is held advanceable and retractable relative to the anvil 21. One end of a thimble 61 is rotatably free-fitted to an outside of the outer sleeve 51 fitted to an outer circumference of the inner sleeve 31, and the other end of the thimble 61 is integrally connected to the spindle 41. A ratchet mechanism 71 free-running when more than a predetermined load is applied to the spindle 41 is provided to a rear end of the spindle 41.

In FIG. 2, a main scale 81A and main scale numeral 81B are formed on an outer circumference of the outer sleeve 51 at an even pitch in axial direction.

Figure 3:
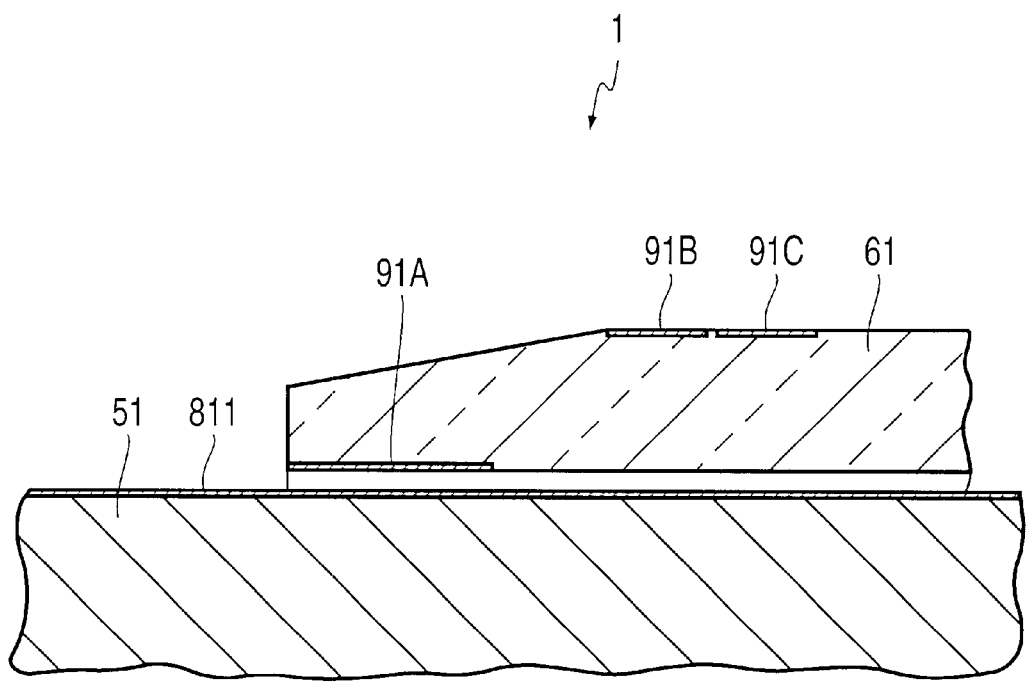
FIG. 3 is an enlarged sectional view showing the thimble portion of FIG. 1.
Figure 4:
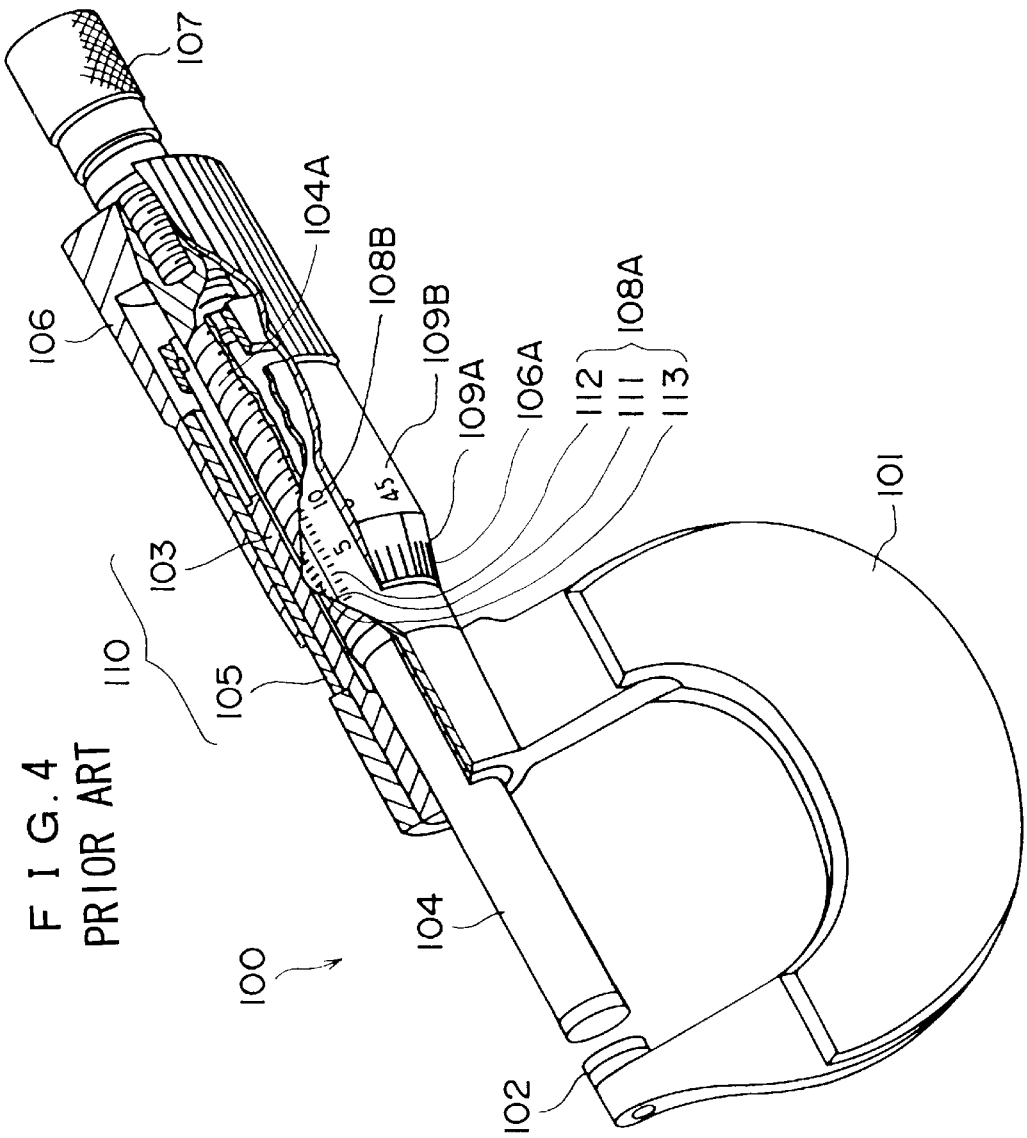
FIG. 4 is a partly fragmented perspective view showing a conventional micrometer.
Figure 5:
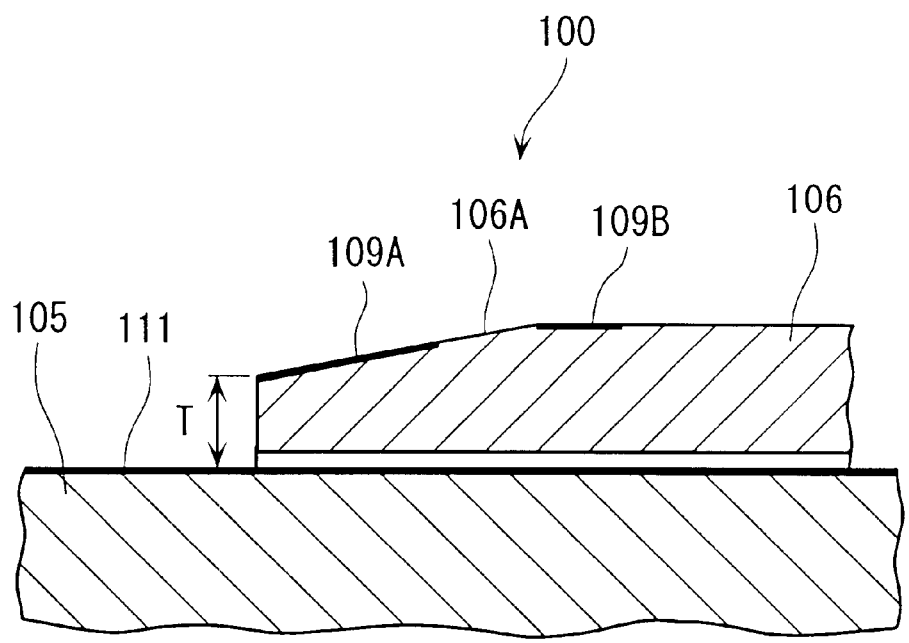
FIG. 5 is an enlarged sectional view showing a thimble portion of the conventional micrometer.

Further, the thimble 61 is made of a translucent material (for instance, a molding material of transparent resin) and a vernier scale 91A equally dividing circumference at fifty pitches is formed on an inner circumference of the thimble 61 substantially in contact with the outer circumference of the outer sleeve 51 and a vernier numeral 109B corresponding to the number of the vernier scale 109A are formed along circumferential direction on an outer circumference of the thimble 106 at an even pitch by printing, engraving, dichroic molding, laser marking etc. Incidentally, the main scale 108A is formed by engraving, printing, dichroic molding, laser marking etc. The vernier scale 109A is, as shown in FIG. 5, formed on a tapered portion 106A of the thimble 106 by engraving, printing, dichroic molding, laser marking etc (see FIG. 3). Incidentally, though the gap between the outer sleeve 51 and the thimble 61 is enlarged in the illustration, the gap actually is very small.

The main scale 81A on the outer sleeve 51 is composed of a base line 811, a base scale 812 at 1 mm pitch and an intermediate scale 813 in the midst of the base scale 812, where interval between the respective scales 81A shows 0.5 mm displacement. Since the thimble 61 advances and retreats by an interval between respective scales 81A (0.5 mm) for one rotation thereof, in other words, the thimble 61 advances and retreats by one scale distance (1 mm) of the main scale 81A by two rotations thereof, the pitch of the thimble 61 becomes 0.5 mm. The vernier scale 91A provided on the thimble 61 equally divides the circumference of the thimble 61 at fifty pitches. Accordingly, one scale of the vernier scale 91A corresponds to one hundredth of one scale of the main scale 81A. In other words, one scale of the vernier scale 91A indicates displacement of 0.01 mm.

The displacement of the spindle 41 relative to the anvil 21 can be measured by the above main scale 81A, the vernier scale 91A, the main scale numeral 81B and the vernier numeral 91B. In other words, dimension of a workpiece held between the anvil 21 and the spindle 41 can be measured by the above arrangement.

Incidentally, in the above embodiment, the base scale 812 of 1 mm pitch and the intermediate scale 813 provided therebetween may have different colors. For instance, when the base scale 812 is blue, the intermediate scale may be red. In this case, the first vernier numeral 91B may be blue in the same manner as the base scale 812 and the second vernier numeral 91C may be red in the same manner as the intermediate scale 812.

According to the above arrangement, read error of the measurer can be further reduced. In other words, since the base scale and the intermediate scale have different colors, the measurer can be definitely aware of which one of measurement unit he/she should be selected.

Further, since the color of the first and the second vernier numeral corresponds to the base scale and the intermediate scale on the main scale, the vernier numeral corresponding to the color of the scale on the main scale most adjacent to the thimble end further comes to measurer's sense, so that the read error can be further effectively prevented by reading the corresponding vernier numeral.

According to the above embodiment, following effect can be obtained.

In the present embodiment, since the second vernier numeral 91C having value of the vernier scale 91A added with respective values of the first vernier numeral 91B, there is no need for mental calculation of adding 0.5 mm to current read value during measurement of 0.5 mm to 1.0 mm and the appropriate second vernier numeral 91C can be directly read, thus reducing read error.

Since the vernier scale 91A is formed on an inner circumference of a transparent thimble 61 and is readable from the outside and since the vernier scale 91A is substantially in contact with the outer circumference of the outer sleeve 51, the level difference can be reduced for the dimension of end surface of the thimble 61, so that the parallax error can be reduced in reading coincidence point of the base line 811 of the main scale 81A with the vernier scale 91A thus further reducing read error.

Incidentally, the scope of the present invention is not restricted to the above embodiment, but includes modification and improvement as long as an object of the present invention can be attained.

For instance, though the above-described embodiment relates to application to the micrometer 1, the present invention is not limited to be applied to the micrometer, but can be also applied to a measuring device having a thimble such as an outside measuring micrometer, an inside measuring micrometer, a depth micrometer capable of measuring depth of a hole, a micrometer head and digital micrometer, for obtaining the same effect as described in the embodiment.

In the above-described embodiment, though read error is reduced by two arrangements, i.e. provision of the second vernier numeral 91C to the thimble 61, and provision of the vernier scale 91A to the inner circumference of the thimble 61 and construction of the thimble 61 by a translucent material, the read error can be reduced as compared to the conventional measuring device by only either one of the arrangements. However, both arrangements are preferably employed for effectively reducing the read error.

Though the material of the entire thimble 61 is a molding material of a transparent resin in the above-described embodiment, the arrangement is not limited and only a part of the material of the thimble 61 having the vernier scale 91A may be made of the molding material of the transparent resin. In other words, any construction is possible as long as at least the material of the thimble 61 provided with the vernier scale 91A is made of a molding material made by the transparent resin (see FIG. 2(B)).

Further, though the molding material made of the transparent resin is employed as the material of the thimble 61, other materials such as glass may be used. In other words, any translucent material can be used as long as the vernier scale 91A formed along the inner circumferential direction can be read on the thimble 61.

The manufacture method of the thimble is not restricted to molding but may be carving.

Though the first vernier numeral 91B of the thimble 61 is 0 to 45 in the above-described embodiment, the arrangement is not restricted but may be, for instance, 0 to 450 (fifty scales interval). In other words, the indication of the first vernier numeral 91B may be changed in accordance with measurement accuracy and the number of the scale of the vernier scale 91A may be changed in accordance therewith. Similarly, the indication of the second vernier numeral 91C may be changed in accordance with the indication of the first vernier numeral 91B.

The interval of values of the first and the second vernier numeral 91B and 91C is not restricted to five, but may be indicated at one scale interval. In short, the first and the second vernier numeral 91B and 91C may be arranged in any manner for the convenience of the measurer to read the value.

Further, when the base scale and the intermediate scale, and the first and the second vernier numerals have different colors, the color is not restricted to only two, but more than two colors may be used as necessary.

Further, though the scale indication is millimeter unit in the above embodiment, inch unit or shaku (Japanese traditional unit) may be used.

Furthermore, though two pairs of the vernier numerals are provided in the above embodiment, more than two vernier numerals may be provided as necessary.

For instance, in a measuring device having a thimble advancing and retracting one scale distance of the main scale (0.1 inch pitch, for example) and vernier scales for quartering the main scale (0.025 inch pitch, for example), in addition to the first vernier numeral (e.g. 1, 2, 3 . . . , 24) and the second vernier numeral (e.g. 25, 26, 27 . . . , 49), the third vernier numeral (e.g. 50, 51, 52 . . . , 74) and the fourth (e.g. 75, 76, 77 . . . , 99) vernier numeral may be provided for definitely sensing vernier scale measurement unit.

What is claimed is:

1. A measuring device, comprising:
a spindle advanceable and retractable relative to a workpiece to be measured;
a sleeve partly screwed to the spindle and having a main scale and a set of main scale numerals on an outer circumference thereof along an axial direction; and
a thimble rotatably provided on an outside of the sleeve and integrally connected to the spindle, the thimble advancing and retracting for one unit of the main scale by two rotations thereof,
wherein an inner circumference of the thimble has a vernier scale for equally dividing a circumference of the thimble in a plurality of units in a circumferential direction, and an outer circumference of the thimble has a set of vernier numerals corresponding to each unit of the vernier scale, and wherein at least a part of the material of the thimble having the vernier scale is translucent.

2. The measuring device according to claim 1, wherein the vernier scale is provided at an end of the thimble, and the set of the vernier numerals are provided nearer the center of the thimble than the vernier scale.

3. A measuring device, comprising:

a spindle advanceable and retractable relative to a workpiece to be measured;

a sleeve partly screwed to the spindle and having a main scale and a set of main scale numerals on an outer circumference thereof along an axial direction; and a thimble rotatably provided on an outside of the sleeve and integrally connected to the spindle, the thimble advancing and retracting for one unit of the main scale by two rotations thereof, wherein an inner circumference of the thimble has a vernier scale for equally dividing a circumference of the thimble in a plurality of units in a circumferential direction, and an outer circumference of the thimble has a first set of vernier numerals corresponding to each unit of the vernier scale, and a second set of vernier numerals equal to addition of a respective value of the first vernier numeral and a value of the vernier scale after one rotation of the thimble, and wherein at least a part of the material of the thimble having the vernier scale is translucent.

4. The measuring device according to claim 3, wherein the main scale has a base scale provided at 1 mm pitch and an intermediate scale provided in the midst of the base scale, the base scale and the intermediate scale having a first color and a second color respectively.

5. The measuring device according to claim 4, wherein the first vernier numeral is colored correspondingly to the base scale and the second vernier numeral is colored correspondingly to the intermediate scale.

6. The measuring device according to claim 3, wherein the vernier scale is provided at an end of the thimble, and the set of the vernier numerals are provided nearer the center of the thimble than the vernier scale.

* * * * *